July 31, 1956  E. BALMER  2,757,048
SPRAYING PISTOL
Filed Jan. 6, 1954

# United States Patent Office 2,757,048
Patented July 31, 1956

2,757,048

SPRAYING PISTOL

Ernst Balmer, Aarburg, Switzerland, assignor to Dr. A. Landolt A.-G., Zofingen, Switzerland Application January 6, 1954, Serial No. 402,481

Claims priority, application Switzerland January 9, 1953

5 Claims. (Cl. 299—89)

The present invention relates to a spraying pistol for atomizing, mixing and spraying several spraying substances.

Sprayers or spraying pistols of the type comprising a container for spraying matter, a feeding duct for compressed air, an adjusting device for controlling the feed of the compressed air and a nozzle serving to atomize the spraying matter contained in the container and entrained by the current of compressed air are well-known in the art.

Other spraying pistols are known for atomizing and spraying two spraying substances, such as for example liquid coloring matter, in which pistols the separately stocked substances are brought together before they are atomized, i. e. before they pass the nozzle. No thorough mixing is obtained with such devices and it may even occur that the spraying substances, according to their consistence, leave the nozzle without any mixing effect at all.

The present invention overcomes these drawbacks of known spraying apparatus and provides a spraying pistol, by means of which even more than two spraying substances may be sprayed in thoroughly mixed condition.

For this purpose a spraying pistol of the aforementioned type is characterized by at least one additional container for spraying matter, said additional container comprising a nozzle, the outlet of which is arranged at the outside of the pistol nozzle but within the zone of action of the compressed air jet, the arrangement being such that the said jet of compressed air causes the spraying matter in the additional container to leave the latter in atomized condition and to be thoroughly mixed with the spraying matter contained in said compressed air jet.

Thereby the nozzle of each additional container may be arranged in the zone of action of the compressed air jet in such a way that the spraying matter contained in the additional container or containers is entrained by this jet and atomized as it passes the nozzle of the additional container.

According to another embodiment of a spraying pistol according to the present invention each additional container may be connected by a conduit with the mouth piece of the pistol so that a portion of the compressed air jet branched off previous to its passing through the pistol nozzle is fed into the additional container or containers and drives out the spraying matter contained therein through the atomizing nozzle or nozzles.

Other objects and advantages of the invention will become apparent from the description now to follow of preferred embodiments thereof, given by way of example only, and in which reference will be had to the accompanying drawings, in which.

Figure 1:
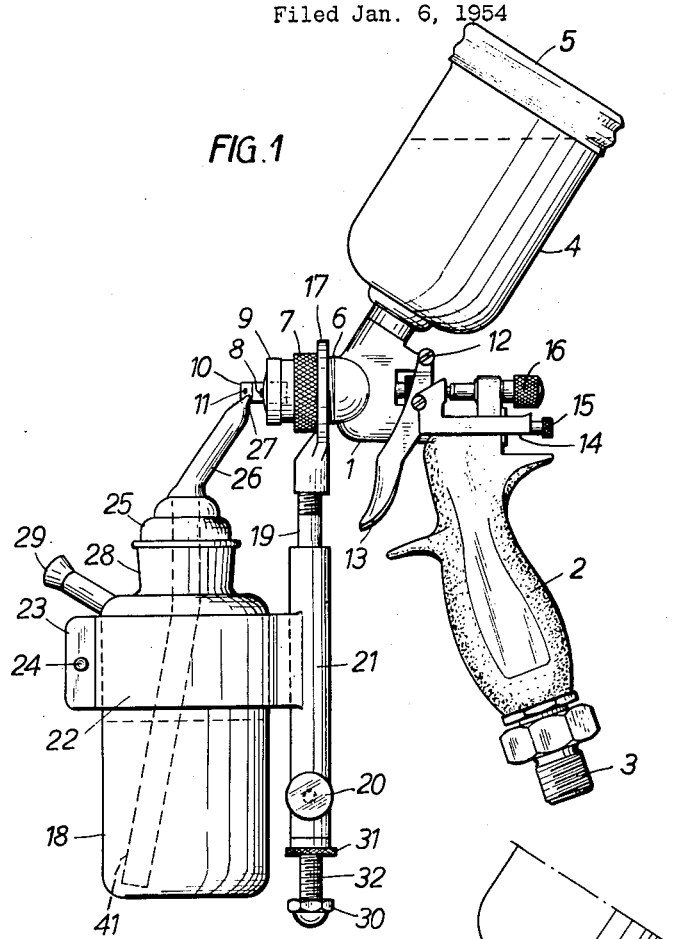
Fig. 1 is a view of a first embodiment.

The pistol body comprises in well known manner an upper portion 1 and a handle 2, extending downwardly from it and serving to the infeed of compressed air for which purpose it is provided at its lower end with a connection piece 3 for a not represented compressed air pipe. A container 4 for a first spraying matter, is closed by a cover 5 screwed onto it, and is secured to the upper portion 1 of the pistol body. The cover 5 is provided with a not represented opening for the air. The outlet tube of this container 4 opens directly into the passage for the compressed air jet in the pistol body portion 1. The latter is provided on its front end with a threaded portion 6, onto which is screwed by means of a nut 7 the mouth piece 9 surrounding the pistol nozzle 8. The mouth piece 9 is provided with two lateral projections 10, of which one only is shown in the drawings and through each of which a narrow air passage leads from the interior of the body portion 1 to a small opening 11 in the front face of the corresponding projection 10, said front faces being directed towards the middle axis of the pistol nozzle 9. These narrow passages serve to direct compressed air, branched-off previous to the passage of the jet through the pistol nozzle, from two sides towards the compressed air jet leaving the pistol nozzle and to obtain a fan-like spreading of this jet at least in one plane.

The feed of the compressed air is controlled in known way by a control device comprising a trigger 13 hinged at 12 to the body portion 1 and acting upon a not represented valve needle in the pistol nozzle 8. The trigger 13 is spring-loaded by a not represented spring adjustable by means of a setting screw 15 and acting upon a member 14 hinged to the trigger 13. The position of the not represented valve needle may be adjusted by means of a further setting screw 16.

An annular flange 17 is held in position on the connection piece 6 by means of the nut 7. A rod 19 is screwed into a threaded portion of this annular flange and a sleeve 21 provided with two flanges 22 is adjustable on this rod 19 by means of a setting screw 20. The two flanges 22 are adapted to hold between them a bottle-like additional container 18 and may for this purpose be clamped together by a screw 24 screwed into their parallel marginal portions 23. With the screw 24 in loose position the container 18 may easily be adjusted and exchanged. A plug-like insert 25 is adapted into the open upper end of the additional container 18. This insert 25 is provided at the end of an elongated portion 26 with a nozzle 27 serving to atomize any spraying matter leaving with a certain velocity the container 18 through the insert 25.

In the embodiment illustrated in Fig. 1 the elongated portion 26 of the insert 25 is inclined with respect to the longitudinal axis of the container so that by turning the insert 25 with respect to the container 18 the nozzle may be brought into the direction of the compressed air jet leaving the pistol nozzle 8.

With the insert 25 removed the bottle-like container 18 may be filled and cleaned through the neck portion 28. Reference numeral 29 designates an air inlet passage.

The described spraying pistol operates as follows:

As the trigger 13 is actuated the spraying matter contained in the container 4 is entrained by the compressed air stream passing through the body portion 1 and leaves the nozzle 8 in atomized condition together with the jet of compressed air. Owing to the jet pump action of this jet the second spraying matter, contained in the container 18, is sucked out through the nozzle 27, which is arranged immediately in front of the pistol nozzle and in the zone of action of the jet of compressed air. Thereby this second spraying matter owing to the action of the nozzle 27 is directed in atomized condition into the jet leaving the pistol nozzle where it is thoroughly mixed with the first spraying matter entrained in atomized condition by the compressed air jet.

As is easily understood the mixing ratio of the two mixed spraying substances depends mainly on the position of the nozzle 27 with respect to the jet leaving the pistol nozzle 8. In order to be able to vary this ratio very easily and practically stepless a setting nut 31 cooperating with a thread 32 provided at the lower end of the rod 19, serves to adjust after unscrewing of the setting screw 20 the position of the sleeve 21 on the rod 19 and therewith the height of the nozzle 27 with respect to the pistol nozzle 8. An end nut 30 prevents loss of the nut 31 and of the sleeve 21.

Figure 2:
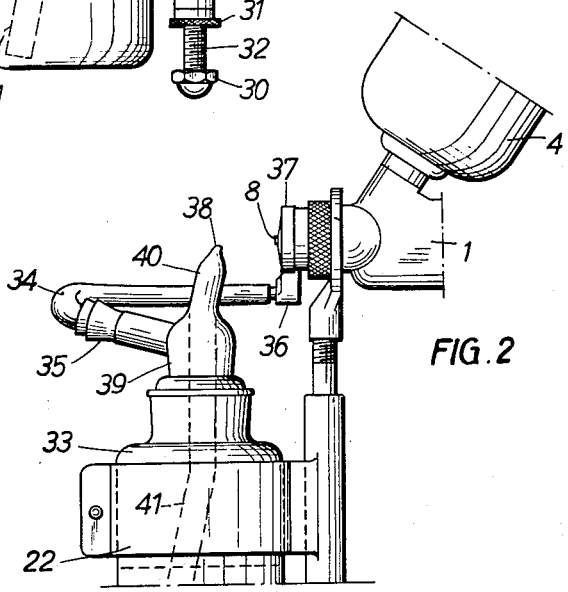
Fig. 2 shows the parts necessary for a clear understanding of a second embodiment of a spraying pistol according to the invention.

In the embodiment illustrated in Fig. 2 the additional container is designated by reference numeral 33. A flexible pipe 34 is connected with its one end to a connection piece 35 at the container 33 and with its other end to a connection piece 36 of the mouth piece 37 of the pistol. A portion of the compressed air passing through the body portion 1 of the pistol is branched off previous to its passage through the pistol nozzle 8 and fed through said flexible pipe 34 into the container 33 where it drives out under pressure the spraying matter contained in this container 33 through the nozzle 30 of an insert 40, whereby the spraying matter leaving the nozzle 38 of the additional container 33 in atomized condition is thoroughly mixed with the atomized first spraying matter leaving the pistol nozzle 8 together with the compressed air jet.

The insert 40 of this second embodiment has a somewhat shorter elongated portion, as the nozzle 38 need not, as in the first embodiment, be arranged immediately in front of the pistol nozzle. The height of the nozzle with respect to the jet may be adjusted in the same way as described with respect to the first embodiment. Similarly all parts not especially mentioned in the description of the second embodiment are similar to the first embodiment.

In both embodiments the elongated portion of the insert of the additional container is prolonged within the container by a tube 41 extending nearly to the bottom of the container. In the first embodiment this tube 41 serves to render possible suction of the spraying matter out of the additional container 18 even if the latter is almost empty while in the second embodiment this tube prevents escaping through the nozzle 38 of the air under pressure entering the container 33 through the connection 35.

The described spraying pistol renders possible spraying of two different spraying substances, particularly spraying liquids but also pulverulent or even granulous matter such as for example the pearls of scotchlite, whereby, as the substances are mixed only subsequent to their atomizing a thorough and effectful mixing is attained.

Spraying pistols according to the present invention may also more particularly be used for spraying varnish together with a hardening agent or with a catalyzer respectively, as well as also for the staining of surfaces, whereby the pre-mordant and the post-mordant may be applied in one working operation.

If more than two different spraying substances are to be applied one or more further additional containers may be provided in addition to the already present additional container, and secured by means of further annular flanges and rods. The nozzles of such further additional container or containers may be arranged in a row within the zone of action fo the jet of compressed air leaving the pistol nozzle. Of course in such a case the mouth piece 37 of the embodiment according to Fig. 2 should be provided with a number of connection pieces 36 corresponding to the number of additional containers.

In addition to the thorough mixing of different spraying substances attained with the pistol according to the invention, a further advantage may be seen in the fact that this pistol may be readily and easily changed into a normal spraying pistol for spraying only one spraying matter and vice versa. The parts fixed by the nut 7 to the pistol body portion 1 over the annular flange 17, e. g. the additional container, sleeve and rod may be manufactured and sold separately as additional device for already existing spraying pistols.

I claim:

1. A spraying pistol comprising a body portion, a spraying nozzle provided at one end thereof, a first container for spraying matter connected to said body portion, means for feeding a mixture of compressed air and spraying matter from said first container through said spraying nozzle to provide a jet of compressed air and atomized spraying matter, a second container for spraying matter, an insert fitted in said second container and comprising a nozzle directed towards said jet of compressed air and atomized spraying matter emerging from said first container, and means for causing the compressed air to drive out spraying matter contained in said second container through the nozzle of said insert to be thoroughly mixed in atomized condition with the atomized spraying matter from said first container entrained by said jet of compressed air.

2. A spraying pistol comprising a body portion, a spraying nozzle provided at one end thereof, a first container for spraying matter connected to said body portion, means for feeding a mixture of compressed air and spraying matter from said first container through said spraying nozzle to provide a jet of compressed air and atomized spraying matter, a second container for spraying matter, an insert fitted in said second container and comprising at the end of an elongated portion a nozzle directed towards and ending in said jet of compressed air and atomized spraying matter emerging from said first container, said jet owing to its jet pump effect causing the spraying matter contained in the second container to be sucked out through and atomized by the nozzle of the insert into said jet to be thoroughly mixed with the atomized spraying matter emerging from the first container.

3. A spraying pistol comprising a body portion, a spraying nozzle provided at one end thereof, a first container for spraying matter connected to said body portion, means for feeding a mixture of compressed air and spraying matter from said first container through said spraying nozzle to provide a jet of compressed air and atomized spraying matter, a second container for spraying matter, duct means connecting said second container with the interior of the pistol body for branching off a portion of the compressed air previous to its passage through the spraying nozzle and leading it into said second container, an insert fitted in said second container and comprising a nozzle directed towards the jet of compressed air and atomized spraying matter emerging from the first container, said branched off portion of compressed air being adapted to drive out the spraying matter contained in the second container through the nozzle in the insert and to direct it in atomized condition into the jet of compressed air and spraying matter from the first container.

4. A spraying pistol comprising a body portion, a spraying nozzle provided at one end thereof, a mouth piece surrounding said spraying nozzle and screwed onto said body portion, a first container for spraying matter connected to said body portion, means for connecting said body portion to a source of compressed air, a duct for compressed air arranged in said body portion for guiding a compressed air stream through said body portion to said spraying nozzle, means causing spraying matter contained in said first container to be entrained through the spraying nozzle by a stream of compressed air passing through said duct and nozzle, a trigger adapted to control the feed of compressed air through said duct and nozzle, duct means in said mouth piece for branching off a portion of the stream of compressed air passing through said body portion and guide it to an opening in said mouth piece, a second container for spraying matter, an insert fitted in said second container and comprising a spraying nozzle, means for adjustably with respect to the pistol nozzle and exchangeably securing this second container to said pistol body and duct means connecting said duct in the mouth piece with the interior of the second container for leading said branched off portion of compressed air into the second container.

5. A spraying pistol comprising a body portion, a spraying nozzle provided at one end thereof, a mouth piece surrounding said spraying nozzle and screwed onto said body portion, a first container for spraying matter connected to said body portion, means for connecting said body portion to a source of compressed air, a duct for compressed air arranged in said body portion for guiding a compressed air stream through said body portion to said spraying nozzle, means causing spraying matter contained in said first container to be entrained through the spraying nozzle by a stream of compressed air passing through said duct and nozzle, a trigger adapted to control the feed of compressed air through said duct and nozzle, at least two duct means in said mouth piece for branching off at least two portions of the stream of compressed air passing through the body portion, at least two additional containers for spraying matter, an insert fitted into each of said additional containers and comprising each a spraying nozzle, means for exchangeably and adjustably with respect to the pistol nozzle securing the additional containers to the pistol body and tubes connecting each of the duct means in said mouth piece with the interior of one of the additional containers, for leading a portion of branched off compressed air into each of the additional containers for driving out spraying matter contained in the latter and direct it into the jet of compressed air and spraying matter emerging from the first container, leaving the pistol nozzle.

References Cited in the file of this patent

UNITED STATES PATENTS

| | | |
|---|---|---|
| 930,087 | Reich | Aug. 3, 1909 |
| 2,148,047 | Epstein | Feb. 21, 1939 |
| 2,310,633 | Heimburger | Feb. 9, 1943 |
| 2,497,101 | Starr | Feb. 14, 1950 |
| 2,550,404 | Chasan | Apr. 24, 1951 |

FOREIGN PATENTS

| | | |
|---|---|---|
| 438,732 | France | Mar. 22, 1912 |